Figure 1:
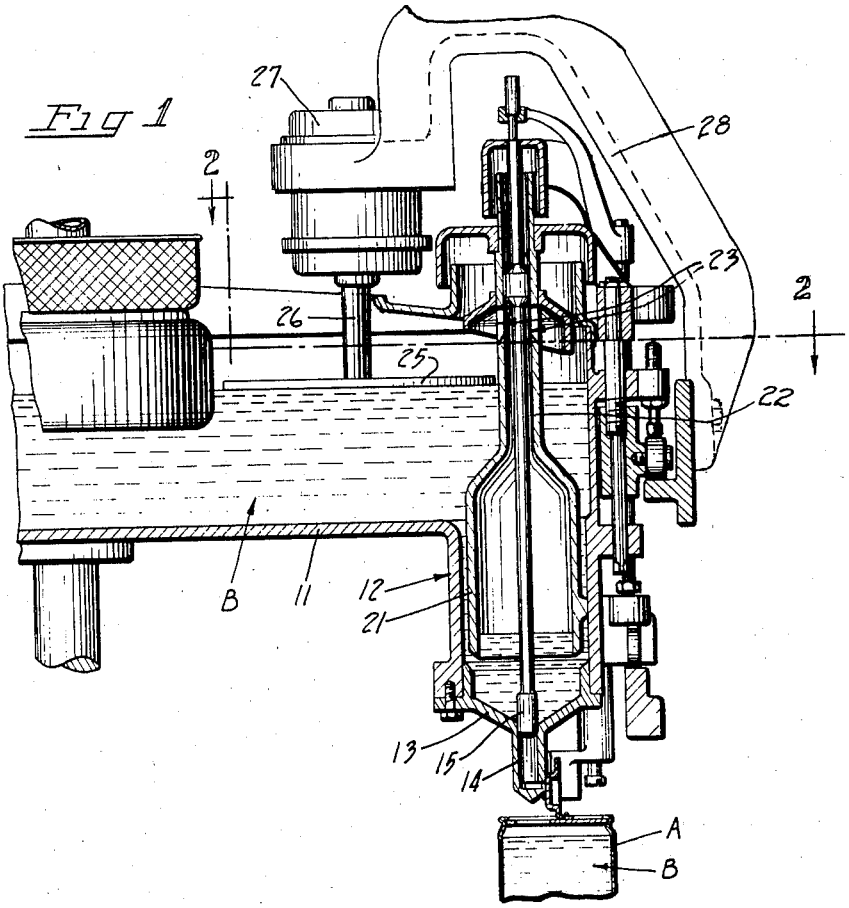

April 4, 1944.    W. McK. MARTIN    2,345,617

FILLING MACHINE

Filed April 15, 1941

INVENTOR.
William McK. Martin
BY Ivan D. Thornburgh
Chas. H. Eune
ATTORNEYS

Patented Apr. 4, 1944

2,345,617

UNITED STATES PATENT OFFICE 2,345,617

FILLING MACHINE

William McK. Martin, Maywood, Ill., assignor to American Can Company, New York, N. Y., a corporation of New Jersey Application April 15, 1941, Serial No. 388,681

1 Claim. (Cl. 226—69)

The present invention relates to liquid filling machines and has particular reference to breaking up foam formed on the surface of the liquid in the machine by mechanical means.

In the filling of containers such as cans and bottles with certain liquids, such as for example, milk, considerable foaming of the liquid sometimes takes place. The foam collects on the surface of the liquid in the machine. In some machines, vent tube openings or ports associated with liquid measuring chambers or filling valves are often necessarily located immediately above the surface of the liquid. With such machines the accumulation of foam around these openings or ports often results in improper operation of the filling devices with occasional slack filling of the containers.

The instant invention contemplates overcoming these difficulties by providing means for breaking up the foam on the surface of the liquid in the immediate vicinity of any involved openings or ports by sweeping through the foam and thus mechanically breaking the bubbles.

An object therefore of the invention is the provision in a machine for filling liquids into containers, of devices which operate to cut through and break up any foam that may be formed on the liquid being filled in the region of the filling elements so that the foam will be prevented from entering the filling elements with the liquid and thereby prevent slack filling of the container.

Numerous other objects and advantages of the invention will be apparent as it is better understood from the following description, which, taken in connection with the accompanying drawing, discloses a preferred embodiment thereof.

Figure 2:
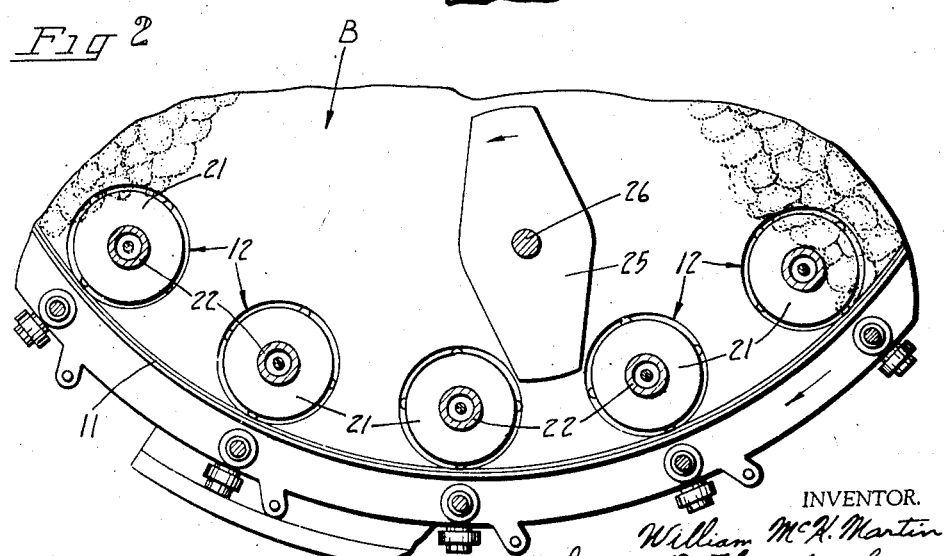

Referring to the drawing:

Figure 1 is a vertical sectional view of a portion of a liquid filling machine embodying the instant invention, with parts broken away; and Fig. 2 is a plan or horizontal section taken substantially along the broken line 2—2 in Fig. 1, with parts broken away.

As a preferred embodiment of the invention the drawing illustrates principal parts of a milk filling machine of the character disclosed in United States Patent 2,222,617, issued November 26, 1940, to J. M. Hothersall et al., on Filling machine. Such a machine fills accurately measured charges of milk into fibre containers A (Fig. 1).

The milk, designated by the letter B, to be filled into the containers A is preferably retained in a rotatable reservoir or tank 11 which is formed adjacent its outer edge with a plurality of spaced depending hollow filling heads 12. The bottom of each head is fitted with a cap 13 having a depending filling nozzle 14 with a vertically movable valve 15. The nozzle is adapted to be inserted into a container A to be filled.

Each filling head 12 contains a vertically movable hollow bottle shaped measuring element 21 having an open bottom and having a reduced diameter tubular neck or levelling tube 22 which extends up through the milk in the tank 11 and projects above the surface of the milk. The levelling tube is formed with a pair of oppositely disposed measuring ports 23 which are located just above the surface of the milk in the tank.

When the machine is in operation and the valve 15 in the nozzle 14 is closed, the measuring element 21 is lifted vertically sufficiently to permit milk to flow from the tank into the measuring element through its open bottom. The milk accordingly fills the measuring element to the level of the milk in the tank. This level in the measuring element is just below the levelling ports 23 in the levelling tube 22.

When filled, the measuring element moves down against the filling head cap 13 and its bottom is thereby closed off from the tank. This segregates the milk in the measuring element from that in the tank. The downward movement of the measuring element also forces some of the segregated milk up into the levelling tube 22 so that a surplus will overflow back into the tank through the levelling ports 23. When the overflowing has ceased there remains in the measuring element a predetermined and accurately measured charge of milk. The valve 15 is then opened and the measured charge of milk discharges into the waiting container A by way of the nozzle 14.

Provision is made to prevent foam, which usually gathers on the surface of the milk due to agitation in the tank, from being drawn down into the measuring element 21 by way of the levelling ports 23 when the measured charge of milk drains out into the container A. This is brought about by a rotatable flat knife or blade 25 which is disposed parallel with and closely adjacent but not touching the surface of the milk in the tank.

The blade 25 is mounted on the lower end of of vertical shaft 26 which is preferably the rotor shaft of an electric motor 27. The motor is supported on a bracket 28 which is secured to a stationary part of the main frame of the machine. The electric motor is rotated continuously when the machine is in operation.

Hence the rotating electric motor 27 revolves the blade 25, preferably at high speed, and this blade cuts into and destroys any foam that comes in contact with it by bursting the air bubbles which constitute the foam. In the instant machine the tank 11 rotates relative to the revolving blade and thus brings the foam into the region of the blade.

The blade 25 is located at the filling station of the machine and hence as each filling head 12 comes into position at the filling station to empty its measured charge of milk into its container A, the rotating blade 25 cuts through and reduces the foam adjacent the levelling ports 23 in the levelling tube of the measuring element 21. This prevents the foam from being drawn down into the measuring element 21 through one or both of the ports 23, where it would interfere with accurate measuring functions on the next and following cycles of the filling head.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a machine for filling foam producing liquids into containers, the combination of a tank rotatable upon a vertical axis for retaining a quantity of the liquid for filling into containers, a plurality of spaced filling heads carried with said tank adjacent its outer edge and movable through a container filling station, a measuring element in each of said filling heads for holding a measured quantity of said liquid, a leveling tube on each of said measuring elements, said leveling tubes each having leveling ports disposed immediately above the surface level of the liquid in the tank, and a rotating horizontal blade mounted on a fixed vertical axis and located in said tank adjacent said filling station, the axis of said blade being disposed between the axis and the periphery of said tank, said blade being spaced closely above the surface level of the liquid in the tank for cutting into and breaking down the surface bubbles of foam and preventing surface foam from contacting with a said filling head when the latter is passing through said filling station, thereby effecting the desired measured fill of liquid into the container.

WILLIAM McK. MARTIN.